United States Patent
Tajima

(10) Patent No.: US 8,108,070 B2
(45) Date of Patent: Jan. 31, 2012

(54) ROBOT AND CONTROL METHOD THEREOF

(75) Inventor: Ryosuke Tajima, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 812 days.

(21) Appl. No.: 12/087,473

(22) PCT Filed: Jul. 17, 2007

(86) PCT No.: PCT/JP2007/064084
§ 371 (c)(1),
(2), (4) Date: Jul. 8, 2008

(87) PCT Pub. No.: WO2008/010485
PCT Pub. Date: Jan. 24, 2008

(65) Prior Publication Data
US 2009/0005906 A1    Jan. 1, 2009

(30) Foreign Application Priority Data

Jul. 18, 2006    (JP) ................................. 2006-195717

(51) Int. Cl.
*G06F 19/00*    (2011.01)
(52) U.S. Cl. ........................................ 700/245
(58) Field of Classification Search .............. 700/245, 700/246, 250, 251, 253, 254, 257, 260; 318/568.2, 318/568.12, 568.17, 568.22, 568.23, 568.24; 901/1, 9, 46, 48
See application file for complete search history.

(56) References Cited

U.S. PATENT DOCUMENTS 6,505,096 B2   1/2003   Takenaka et al.
(Continued)

FOREIGN PATENT DOCUMENTS

EP    1 466 705    10/2004
(Continued)

OTHER PUBLICATIONS

K. Nishiwaki, t. Kitagawa, T. Sugihara, S. Kagami, M. Inaba, H. Inoue: *Fast Generation Method of Dynamically Stable Trajectory of Humanoid Motion based on the Characteristics of ZMP*, Pamphlet of 18$^{th}$ Annual Conference of Robotics Society of Japan, Sep. 12, 2000, pp. 721-722.

(Continued)

*Primary Examiner* — James Trammell
*Assistant Examiner* — Thanh V Nguyen
(74) *Attorney, Agent, or Firm* — Kenyon & Kenyon LLP

(57) ABSTRACT

The present invention provides a technique that makes a robot continue a stabilized walk, even when an actual movement state of the robot deviates greatly from a target movement state of the robot. The robot includes a trunk, a pair of leg links coupled with the trunk in a swingable manner, an actuator group that swings each of the leg links independently to the trunk, and a controller that controls the actuator group. The controller is programmed to control the actuator group and realize a given trajectory of the center of gravity and the trajectory of the toe of the leg link. The controller performs, in a period from the robot grounding the one leg link to grounding the other leg link swung out thereafter: updating the trajectory of the center of gravity of the robot after grounding the other leg link, determining a predetermined position for grounding the other leg link, on the basis of an updated trajectory of the center of gravity, and updating the trajectory of the toe of the other leg link till grounding the other leg link, on the basis of a determined predetermined position for grounding.

3 Claims, 6 Drawing Sheets

U.S. PATENT DOCUMENTS

| | | | |
|---|---|---|---|
| 6,697,709 B2 | 2/2004 | Kuroki et al. | |
| 6,865,446 B2 | 3/2005 | Yokono et al. | |
| 6,898,485 B2 | 5/2005 | Kuroki et al. | |
| 7,112,938 B2 | 9/2006 | Takenaka et al. | |
| 7,400,939 B2 * | 7/2008 | Nagasaka | 700/245 |
| 7,698,020 B2 | 4/2010 | Kawai et al. | |
| 7,805,218 B2 * | 9/2010 | Nagasaka | 700/245 |
| 2002/0022907 A1 | 2/2002 | Takenaka et al. | |
| 2004/0176875 A1 | 9/2004 | Iribe et al. | |
| 2004/0211603 A1 | 10/2004 | Furuta et al. | |
| 2005/0038560 A1 | 2/2005 | Nagasaka | |
| 2005/0107916 A1 | 5/2005 | Nagasaka | |
| 2005/0228540 A1 | 10/2005 | Moridaira | |

FOREIGN PATENT DOCUMENTS

| | | |
|---|---|---|
| EP | 1 559 519 | 8/2005 |
| JP | 05-305585 A | 11/1993 |
| JP | 2004-114243 A | 4/2004 |
| JP | 2004-142095 | 5/2004 |
| JP | 2004-167676 | 6/2004 |
| JP | 3599244 B2 | 9/2004 |
| JP | 2005-007496 A | 1/2005 |
| JP | 2006-175567 A | 7/2006 |
| JP | 2006-247769 A | 9/2006 |
| WO | WO 02/40224 A1 | 5/2002 |
| WO | WO 03/057426 A1 | 7/2003 |
| WO | WO 2006/083028 A1 | 8/2006 |

OTHER PUBLICATIONS

Y. Minemura: *Learning with C and Java, A Guide to Numerical Simulation*, Morikita Publishing Company, Apr. 30, 1999, $1^{st}$ ed., pp. 61-64, 178-180.

*Motion having a Flight Phase: Experiments Involving a One-legged Robot*; Tajima et al., Proceedings of the 2006 IEEE, International Conference on Intelligent Robots and Systems (Oct. 9-15, 2006).

Motion having a Flight Phase: Experiments Involving a One-legged Robot; Tajima et al., the $24^{th}$ annual conference of the Robotics Society of Japan (Sep. 14-16, 2006).

Office Action issued on Sep. 14, 2010 in co-pending U.S. Appl. No. 11/794,496, filed Jun. 29, 2007, Inventor: Jaime Figueroa.

* cited by examiner

ROBOT AND CONTROL METHOD THEREOF

This is a 371 national phase application of PCT/JP2007/064084 filed 17 Jul. 2007, which claims priority of Japanese Patent Application No. 2006-195717 filed 18 Jul. 2006, the contents of which are incorporated herein by reference.

TECHNICAL FIELD

This application claims priority based on the Japanese patent application No. 2006-195717 filed on Jul. 18, 2006, the entire disclosure of which is incorporated herein by reference.

The present invention relates to a robot and a method of controlling the movement thereof.

BACKGROUND ART

There are recent developments in a robot that has at least one leg link and repeats a movement of swinging out the leg link in the direction to move with the leg link swung out and grounded as a supporting leg.

The above robot is generally known to be able to perform a stabilized walk by controlling the movement with attention to a ZMP (Zero Moment Point). The ZMP represents a point on a floor where the sum of moments by the external forces (including inertia) acting on the robot is zero. If the ZMP is coincident with the point of application of a floor reaction, even if only one leg link is grounded, the moment to bring down the robot will not act. The point of application of the floor reaction is located inside the flat foot of the supporting leg in a state that only one leg link is grounded. Accordingly, to make the robot perform a stabilized walk requires a control such that the ZMP is maintained inside the flat foot of the supporting leg.

If a robot has a pair of leg links, for example, the robot moves by using one leg link as the supporting leg and swinging out the other leg link forward as a loose leg. If the ZMP is located inside the flat foot of the supporting leg while the one leg link is grounded, the robot will not tumble. While the leg link having been the loose leg is grounded and both the leg links are grounded, if the ZMP moves from the flat foot of the leg link having been the supporting leg thus transfer into the flat foot of the newly grounded leg link, the robot will not tumble and will be able to swing out forward the leg link having been the supporting leg till then. When the robot swings out forward the leg link having been the supporting leg till then, if the ZMP is located inside the flat foot of the new supporting leg, the robot will not tumble. Thus, the robot will be able to continue a walk without tumbling, by repeating the movement of swing out one of the leg links and grounding it mutually between a pair of the leg links.

In general, a sequential movement mode wherein a robot is able to perform a stabilized walk is calculated in advance before the robot practically performs the movement. Hereunder, the data expressing the sequential movement mode of the robot is referred to as gait data. By storing the gait data calculated in order that the robot can stably walk and by sequentially performing the movement mode that the stored gait data expresses, the robot is able to perform a stabilized walk.

Unexpected disturbances can act on the robot in some cases. In some cases unexpected uneven road surfaces can cause unexpected disturbances to the robot, in other cases disturbances that push or pull the robot from the outside. If the movement of the robot slips out of the gait data because of a structural deflection of the robot, an articular looseness of the robot, a response delay of the robot, and so forth, it will be the same such that unexpected disturbances act on the robot. When unexpected disturbances act on the robot, it makes the robot lose its balance.

In order to continue the walk even when unexpected disturbances act on, it is effective for the robot to update the stored gait data in real time. The technique to generate the gait data of the robot in real time is disclosed, for example, in the Japanese Laid-Open Patent Publication No. 2004-114243.

DISCLOSURE OF INVENTION

In the conventional technique, only the trajectory of the center of gravity of the robot is updated on the basis of an actual movement of the robot, and the trajectory of a toe of the leg link is not updated. The 'trajectory' in this specification refers to the data to describe the positional variations with time. In the conventional technique, the trajectory of the toe of the leg link is set in advance on the basis of a walking mode such as a length of step, a walking cycle, an angle of turn-around, and an environmental configuration, etc. If the conventional technique updates only the trajectory of the center of gravity of the robot in real time without updating the trajectory of the toe of the leg link, as far as the deviation of the actual movement of the robot from a target movement is slight, the conventional technique can realize the walking mode preset to the robot, which is yet effective.

However, in case the actual movement of the robot greatly deviates from the target movement, the above technique cannot stabilize the movement of the robot. If unexpected disturbances act on the robot, for example, and the actual trajectory of the center of gravity greatly deviates from a target trajectory of the center of gravity, the above technique will not modify the target trajectory of the toe of the leg link. Accordingly, the robot will try to realize the target trajectory of the toe of the leg link from an unreasonable posture, and the movement of the robot thereafter is apt to be unstable.

The present invention solves the above problem. The present invention provides the technique, whereby the robot performing a walking movement can continue a stabilized walk, even in case the actual movement of the robot greatly deviates from the target movement.

The present invention is embodied in a robot. The robot comprises a trunk, a pair of leg links coupled with the trunk in a swingable manner, an actuator group that swings each of the leg links independently with respect to the trunk, and a controller that controls the actuator group. The robot walks by repeating a movement that swings out one leg link with respect to the trunk and grounds it mutually between a pair of the leg links. The controller is programmed to control the actuator group, when a trajectory of the center of gravity of the robot and a trajectory of a toe of the leg link are given, to realize the given trajectory of the center of gravity and the trajectory of the toe of the leg link. The controller performs, in a period from grounding the one leg link to grounding the other leg link swung out thereafter: (1) updating the trajectory of the center of gravity of the robot after grounding the other leg link, (2) determining a predetermined position for grounding the other leg link, on the basis of the updated trajectory of the center of gravity, and (3) updating the trajectory of the toe of the other leg link till grounding the other leg link, on the basis of the determined predetermined position for grounding.

The above robot determines, each time of grounding the one leg link, a predetermined position for grounding the other leg link swung out thereafter, and updates the trajectory of the toe of the other leg link on the basis of the determined predetermined position for grounding. The predetermined position for grounding is determined on the basis of the trajectory of the center of gravity of the robot after grounding the other leg link, in a manner that the movement of the robot after grounding the other leg link becomes stabilized.

For example, the above robot, grounding the right leg link, determines a predetermined position for grounding the left leg link swung out thereafter, and updates the trajectory of the toe of the left leg link on the basis of the determined predetermined position for grounding. The predetermined position for grounding the left leg link is determined on the basis of the trajectory of the center of gravity of the robot after grounding the left leg link.

The robot according to the present invention is able to dynamically update the predetermined position for grounding the leg link during a walk, corresponding to the trajectory of the center of gravity of the robot in the movement thereafter. Therefore, if unexpected disturbances acting on the robot requires correcting the trajectory of the center of gravity of the robot corresponding to the disturbances, for stabilizing the walking movement of the robot thereafter, the robot is able to correct the predetermined position for grounding the leg link corresponding to the corrected trajectory of the center of gravity to continue a stabilized movement. While the robot is walking, if the user issues a command of modifying the trajectory of the center of gravity (for example, a command of increasing or decreasing the velocity of the center of gravity), the robot modifies the predetermined position for grounding the leg link on the basis of the modified trajectory of the center of gravity to perform a stabilized movement.

In the above robot, it is preferable that a horizontal component of the trajectory of the center of gravity in a period of grounding both the leg links is given in a form of an equal velocity trajectory.

When the center of gravity of the robot moves at an equal velocity in the horizontal direction, the ZMP is located right below the center of gravity. Therefore, when moving the ZMP from the flat foot of the leg link grounded behind to the flat foot of the leg link grounded ahead, by giving the horizontal component of the trajectory of the center of gravity in a form of an equal velocity, it becomes possible to determine the trajectory of the center of gravity for realizing a stabilized movement with a simplified calculation, and to achieve a stabilized walk with a small amount of calculation.

The present invention is embodied in a method of controlling a robot. The method is a control method of the robot comprising a trunk, a pair of leg links coupled with the trunk in a swingable manner, an actuator group that swings each of the leg links independently with respect to the trunk, and a controller that, when a trajectory of the center of gravity of the robot and a trajectory of a toe of the leg link are given, controls the actuator group so as to realize the given trajectory of the center of gravity and trajectory of the toe. The robot walks by repeating the movement that swings out one leg link with respect to the trunk and grounds it mutually between a pair of the leg links. The method comprises the following steps of, in a period from grounding one leg link to grounding the other leg link swung out thereafter: (1) updating the trajectory of the center of gravity of the robot after grounding the other leg link, (2) determining a predetermined position for grounding the other leg link, on the basis of the updated trajectory of the center of gravity, and (3) updating the trajectory of the toe of the other leg link till grounding the other leg link, on the basis of the determined predetermined position for grounding.

According to the present invention, the robot performing a walking movement is able to continue a stabilized walk, even if the actual movement of the robot greatly deviates from a target movement of the robot.

BRIEF DESCRIPTION OF DRAWINGS

FIG. 2 is a schematic drawing of the walking movement of the robot 2 relating to the present invention, wherein FIG. 2(A) illustrates the walking movement of the robot 2 in the phase of one leg being grounded, FIG. 2(B) illustrates the walking movement of the robot 2 in the phase of both the legs being grounded, following the movement in FIG. 2(A), and FIG. 2(C) illustrates the walking movement of the robot 2 in the phase of one leg being grounded, following the movement in FIG. 2(B).

BEST MODE FOR CARRYING OUT THE INVENTION

Principal features of the embodiments described hereunder will be listed.

(Feature 1) When updating the trajectory of the center of gravity of the robot, the controller updates the trajectory of the center of gravity of the robot in the one-leg-grounded phase, in a manner that the ZMP of the robot realized in the one-leg-grounded phase is maintained inside the flat foot.

(Feature 2) When updating the trajectory of the center of gravity of the robot, the controller updates the trajectory of the center of gravity of the robot in the both-legs-grounded phase, in a manner that the center of gravity moves at an equal velocity in the both-legs-grounded phase.

(Feature 3) The controller, further including a means to detect an actual velocity of the center of gravity of the robot, updates the trajectory of the center of gravity of the robot on the basis of the detected velocity of the center of gravity.

Figure 1:
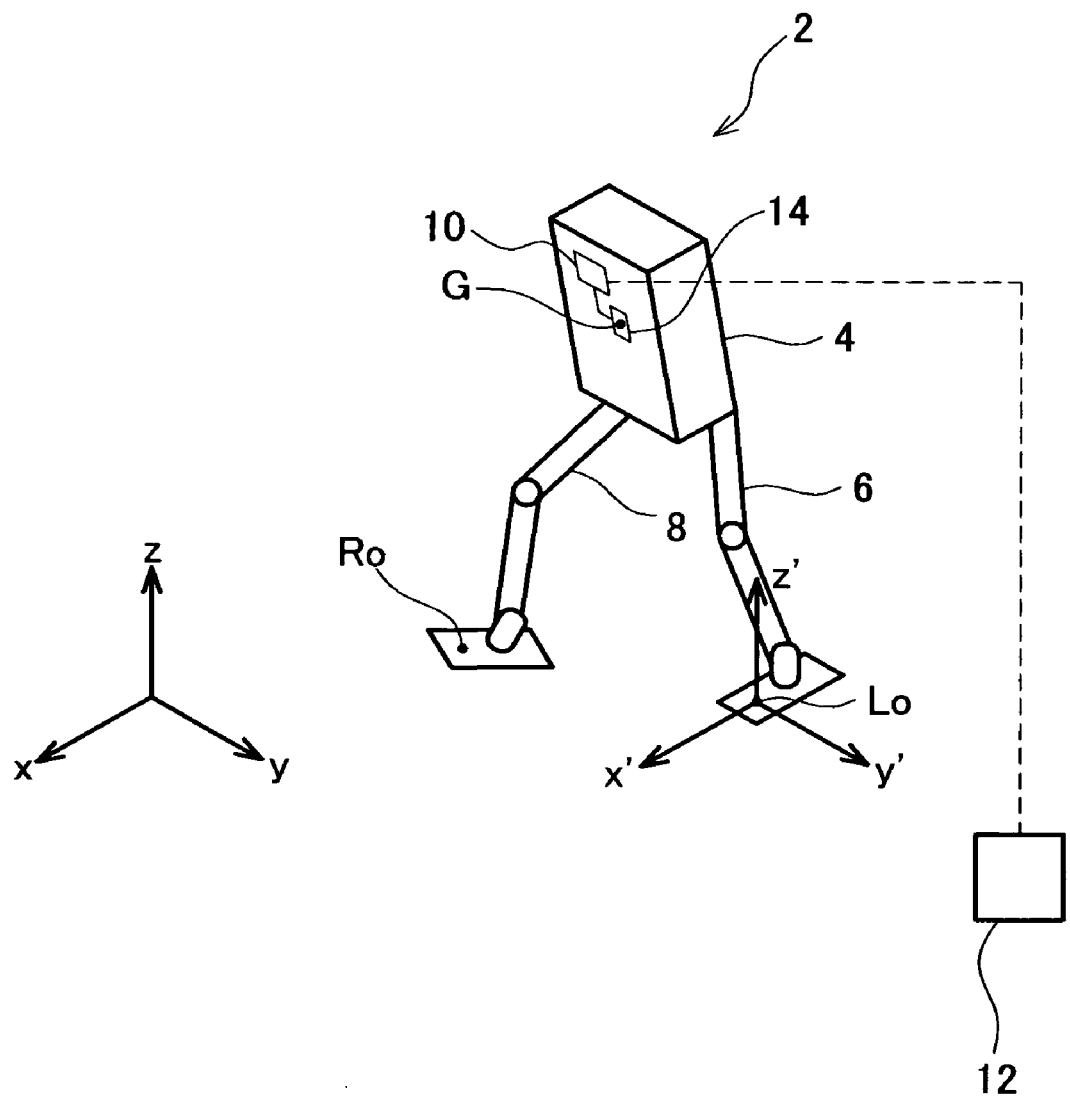
FIG. 1 is a schematic drawing of a robot 2 relating to the present invention.

The movement control of the robot 2 relating to one embodiment of the present invention will be described with reference to the drawings. FIG. 1 schematically illustrates the robot 2 relating to this embodiment. The robot 2 includes a trunk 4, a left leg link 6, a right leg link 8, a control unit 10, an input/output device 12, and a sensor group 14. The left leg link 6 is coupled in a swingable manner to the trunk 4 on one end thereof by way of a hip joint. The left leg link 6 further includes a knee joint and an ankle joint, and a flat foot on the end. The right leg link 8 is coupled in a swingable manner to the trunk 4 by way of the hip joint. The right leg link 8 further includes a knee joint and an ankle joint, and a flat foot on the end. Reference points L0, R0 are provided on the centers of the flat feet of the left leg link 6 and the right leg link 8, respectively. The reference points L0, R0 are the points to be referred to in generating gait data of the robot 2. The symbol G in the drawing signifies the position of the center of gravity of the robot 2.

Each of the joints of the robot 2 includes an actuator group 318 (not illustrated in FIG. 1). The actuator group 318 drives to rotate each of the joints by an instruction from the control unit 10. And each of the joints of the robot 2 is provided with an encoder group 320 (not illustrated in FIG. 1). The encoder group 320 outputs the variation with time of the joint angle of each joint to the control unit 10.

The control unit 10 is a computer device having a CPU, a ROM, a RAM, and a hard disk, etc. The control unit 10 is capable of communicating with the input/output device 12, and receives a user command value from the input/output device 12 that a user operates. The control unit 10 generates the gait data of the robot 2 based on the user command value. The control unit 10 stores the generated gait data, and drives each of the joints so as to realize the movement that the stored gait data express. The details of the control unit 10 will be described later.

The sensor group 14 includes an acceleration sensor 322 (not illustrated in FIG. 1) and a gyro sensor 324 (not illustrated in FIG. 1) that the position and posture of which are fixed. The acceleration sensor 322 is capable of measuring the acceleration along the three-axis, and the gyro sensor 324 is capable of measuring the angular velocity about the three-axis. In regard to the measuring points of the acceleration sensor 322 and the gyro sensor 324, the positions thereof are adjusted in a manner that the measuring points substantially coincide with the position of the center of gravity in a state that the robot 2 stands upright and still. The sensor group 14 is connected to the control unit 10, and transmits the measured acceleration and angular velocity to the control unit 10.

Figure 2:
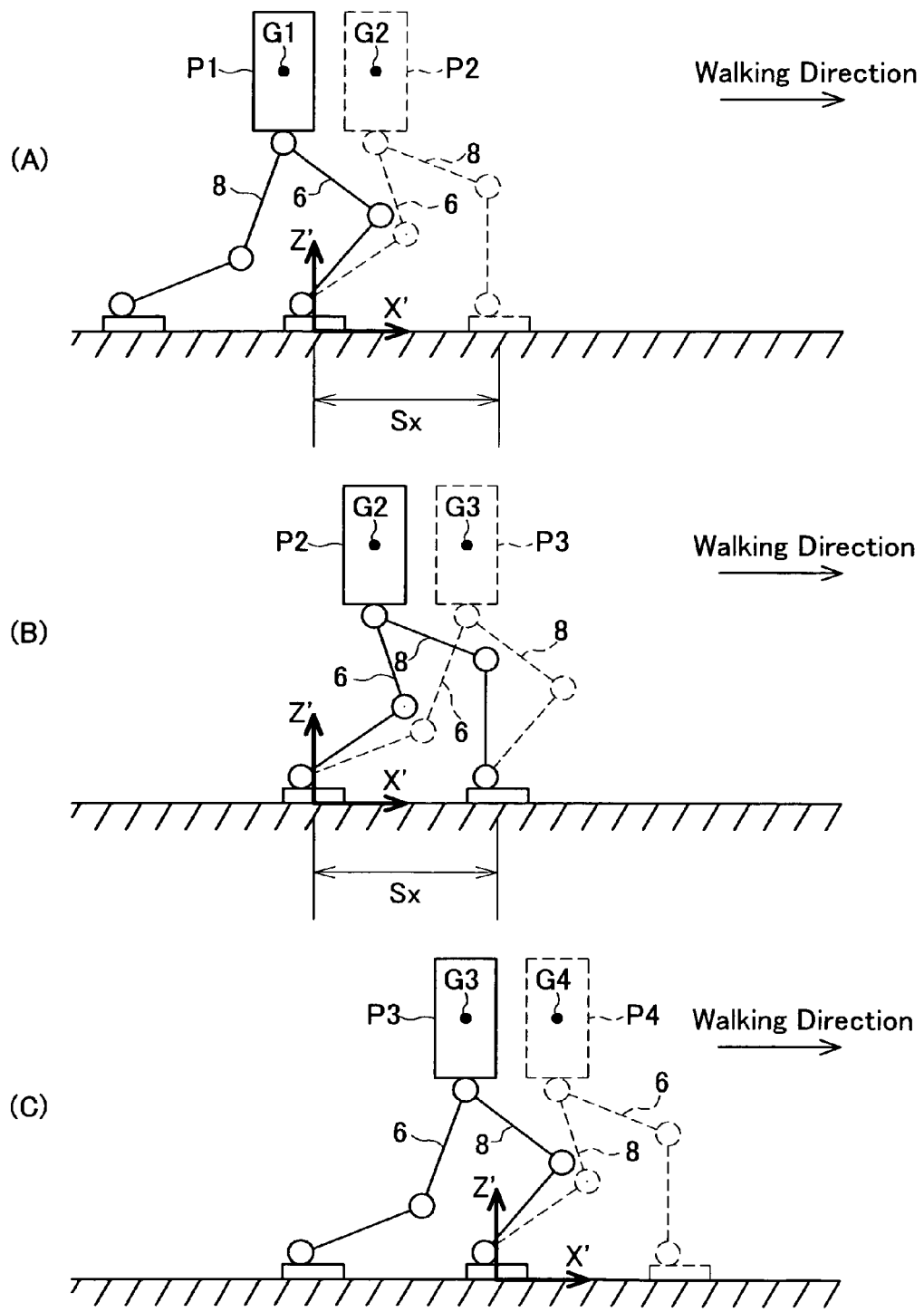

FIG. 2 schematically illustrates the walking movement of the robot 2 relating to this embodiment. As illustrated in FIG. 2(A), the robot 2 has a posture P1 wherein both the leg links of the robot 2 are grounded at a point of time. When the robot 2 has the posture P1, the center of gravity of the robot 2 is located at a position G0. From this posture P1, as the state of grounding the leg link ahead of the robot 2 (i.e. the left leg link 6 in FIG. 2(A)) is maintained intact as a supporting leg, the robot 2 lifts up and swings out forward the leg link being grounded behind the robot 2 (i.e. the right leg link 8 in FIG. 2(A)) as a loose leg. As the leg link swung out forward is grounded, the robot 2 assumes a posture P2 wherein both the leg links are grounded. Both of the posture P1 and the posture P2 are the posture wherein both the leg links are grounded. The leg link that grounded ahead of the robot 2 in the posture P1 (i.e. the left leg link 6) grounds behind the robot 2 in the posture P2. The leg link that grounded behind of the robot 2 in the posture P1 (i.e. the right leg link 8) grounds ahead of the robot 2 in the posture P2. The transfer of the posture of the robot 2 from the posture P1 to P2 makes the center of gravity of the robot 2 move from the position G1 into the position G2.

Thereafter, the robot 2 moves the center of gravity ahead as the state of grounding both the leg links is maintained intact, as illustrated in FIG. 2(B). In this movement, the robot 2 alters the posture from the posture P2 into the posture P3. By this movement, the center of gravity of the robot 2 moves from the position G2 into the position G3.

Thereafter, as illustrated in FIG. 2(C), as the robot 2 maintains the leg link being grounded ahead (i.e. the right leg link 8) intact as the supporting leg, the robot 2 lifts up and swings out forward the leg link being grounded behind (i.e. the left leg link 6) as the loose leg. As the leg link being swung out forward is grounded, the robot 2 assumes a posture P4 wherein both the leg links are grounded. By altering the posture from the posture P3 into the posture P4, the center of gravity of the robot 2 moves from the position G3 into the position G4.

By repeating the above movement, the robot 2 walks ahead.

In the robot 2 of this embodiment, the movement that the robot 2 performs is divided into several movement sections. In the robot 2 of this embodiment, the movement state wherein only one leg link is grounded (one-leg-grounded phase) and the movement state following the former state wherein both the leg links are grounded (both-legs-grounded phase) are handled as one movement section. In the example of FIG. 2, FIG. 2(A) and FIG. 2(C) illustrate the walking movement of the robot 2 in the one-leg-grounded phase, and FIG. 2(B) illustrates the walking movement of robot 2 in the both-legs-grounded phase. In the example of FIG. 2, the one-leg-grounded phase in FIG. 2(A) and the both-legs-grounded phase in FIG. 2(B) are included in one movement section. The one-leg-grounded phase and the both-legs-grounded phase are alternately repeated, when the robot 2 performs a walk.

Hereunder, the coordinate system fixed to the floor outside the robot 2 is expressed by (x, y, z), which is used as the coordinate system that expresses the trajectory of the robot 2. And, the coordinate system fixed to the reference point on the robot 2 is expressed by (x', y', z').

In the robot 2 of this embodiment, the reference point of the flat foot of the supporting leg is assumed to be the origin of the coordinate system (x', y', z') in the one-leg-grounded phase as illustrated in FIG. 2(A) and FIG. 2(C). And in the both-legs-grounded phase as illustrated in FIG. 2(B), the leg link grounded behind the robot 2 (that is, the leg link having been the supporting leg in the one-leg-grounded phase directly before the both-legs-grounded phase) is handled as the supporting leg for convenience' sake, and the reference point of the flat foot of the leg link handled as the supporting leg is assumed to be the origin of the coordinate system (x', y', z'). In the discussion hereunder, the position, velocity, acceleration, and trajectory described by the coordinate system (x', y', z') fixed to the reference point on the robot 2 are expressed as the relative position, relative velocity, relative acceleration, and relative trajectory, respectively. And, the ZMP described by the coordinate system (x', y', z') is expressed as the relative ZMP.

The robot 2 of this embodiment generates and stores the gait data of each of the movement sections, and sequentially reads out the stored gait data to perform the walking movement.

Further, the robot 2 of this embodiment generates the gait data thereafter again, when the one-leg-grounded phase is switched into the both-legs-grounded phase, corresponding to an actual velocity of the center of gravity measured by the encoder group 320 and the sensor group 14 and a user command value given by the user by way of the input/output device 12, and updates the stored gait data. As a user command value is newly inputted during the walking movement of the robot 2, the user command value is stored in the control unit 10, and is reflected in updating the gait data thereafter.

The operation of the control unit 10 will now be described in detail.

Figure 3:
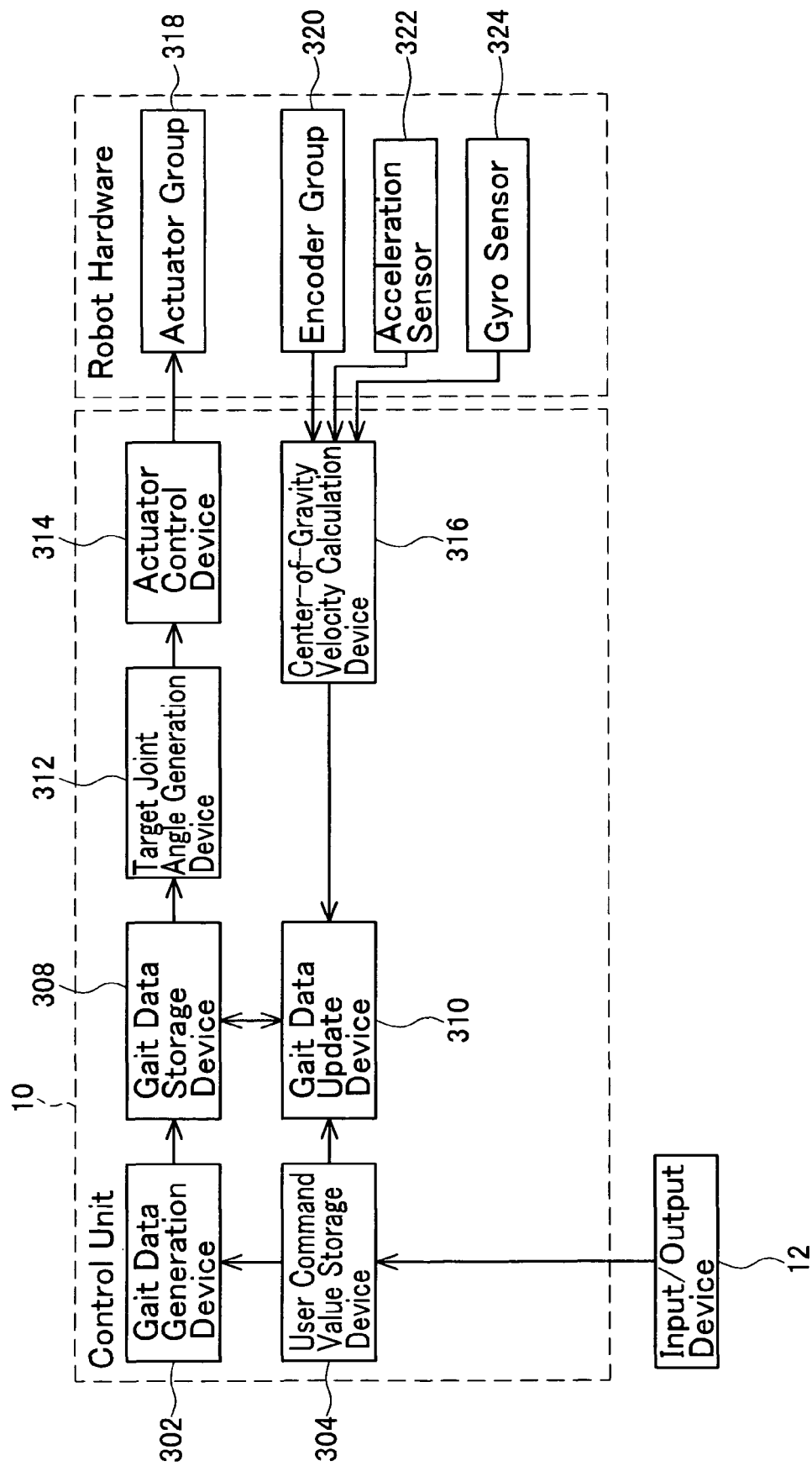
FIG. 3 is a block diagram illustrating a construction of a control unit 10 of the robot 2 relating to the present invention.

FIG. 3 is a block diagram illustrating a functional construction of the control unit 10. The control unit 10 includes a user command value storage device 304, a gait data generation device 302, a gait data storage device 308, a target joint angle generation device 312, an actuator control device 314, a center-of-gravity velocity calculation device 316, and a gait data update device 310.

The user command value storage device 304 stores a user command value inputted by a user. As a new user command value is inputted during the movement of the robot 2, the control unit 10 updates the user command value stored in the user command value storage device 304 into a user command value newly inputted. When the gait data are updated thereafter, the newly inputted user command value is reflected on generating the gait data of the robot 2. The user, viewing the walking movement of the robot 2, inputs the user command value by using the input/output device 12 to thereby control the movement of the robot 2 in real time.

The gait data generation device 302 generates a relative trajectory of the center of gravity of the robot 2 in each of the movement sections and a relative trajectory of the toe of the loose leg, on the basis of the user command value stored in the user command value storage device 304. The relative trajectory of the center of gravity generated by the gait data generation device 302 is the trajectory of the center of gravity described by the coordinate system (x', y', z') wherein the reference point set to the flat foot of the supporting leg of the robot 2 is assumed to be the origin. The relative trajectory of the toe of the loose leg generated by the gait data generation device 302 is the trajectory of the toe described by the coordinate system (x', y', z') wherein the reference point set to the flat foot of the supporting leg of the robot 2 is assumed to be the origin. The details of the processing will be described later, wherein the gait data generation device 302 generates the relative trajectory of the center of gravity and the relative trajectory of the toe of the loose leg. The gait data generation device 302 makes the gait data storage device 308 store the relative trajectory of the center of gravity and the relative trajectory of the toe of the loose leg of the robot 2 in each of the movement sections.

The gait data storage device 308 stores the relative trajectory of the center of gravity and the relative trajectory of the toe of the loose leg of the robot 2 in each of the movement sections.

The target joint angle generation device 312 generates sequential data of the target joint angles of each joint of the robot 2, by performing the so-called inverse kinematics calculation, on the basis of the relative trajectory of the center of gravity and the relative trajectory of the toe of the loose leg which are stored in the gait data storage device 308. The target joint angle generation device 312 outputs the generated sequential data of the target joint angles of each joint to the actuator control device 314.

The actuator control device 314 drives the actuator group 318 on the basis of the sequential data of the target joint angles of each joint generated by the target joint angle generation device 312. By the actuator control device 314 driving the actuator group 318, the robot 2, rotating the joints and altering the posture, performs a walking movement.

The center-of-gravity velocity calculation device 316 calculates the velocity of the center of gravity, on the basis of sequential variations of the joint angles of joints of the robot 2 outputted from the encoder group 320, sequential variations of the accelerations of the trunk 4 outputted from the acceleration sensor 322, and sequential variations of the angular velocities of the trunk 4 outputted from the gyro sensor 324.

The center-of-gravity velocity of the robot 2 can be acquired, for example, by the following process: calculating the velocity of the trunk 4 by integrating the acceleration of the trunk 4 outputted from the acceleration sensor 322, calculating the variation in time of the positional relation between the center of gravity of the robot 2 and the trunk 4 from the sequential variations of the joint angles of joints of the robot 2 outputted from the encoder group 320, and calculating the sum of the former two. The calculated center-of-gravity velocity is outputted to the gait data update device 310.

The gait data update device 310 newly generates the relative trajectory of the center of gravity of the robot 2 and the relative trajectory of the toe of the loose leg in each of the movement sections, on the basis of the user command value stored in the user command value storage device 304 and the center-of-gravity velocity of the robot 2 calculated by the center-of-gravity velocity calculation device 316. The details of the processing will be described later, wherein the gait data update device 310 generates the relative trajectory of the center of gravity of the robot 2 and the relative trajectory of the toe of the loose leg. The relative trajectory of the center of gravity of the robot 2 and the relative trajectory of the toe of the loose leg in each of the movement sections generated by the gait data update device 310 are replaced by the relative trajectory of the center of gravity and the relative trajectory of the toe of the loose leg which are till then stored in the gait data storage device 308.

The processing whereby the gait data generation device 302 generates the gait data of the robot 2 will now be described with reference to FIG. 4.

Step S402 sets the variable k indicating the number of a movement section where a movement is generated to 1.

Step S404 reads out the user command value from the user command value storage device 304. The following parameters can be given in the form of the user command value.
(1) height (vertical position) of the center of gravity
(2) duration of the one-leg-grounded phase
(3) duration of the both-legs-grounded phase
(4) target relative ZMP trajectory
(5) target sequential data of angular momentum
(6) horizontal velocity of the center of gravity in switching the movement The height (vertical position) of the center of gravity of the above (1) is a height at which the center of gravity of the robot 2 is located. The height of the center of gravity can be given arbitrarily by the user within a range that the mechanism of the robot 2 geometrically permits. The height of the center of gravity of the robot 2 of this embodiment is set to become constant in every movement section.

The duration of the one-leg-grounded phase of the above (2) is a time within which the one-leg-grounded phase continues. The duration of the both-legs-grounded phase of the above (3) is a time within which the both-legs-grounded phase continues. The duration of the one-leg-grounded phase and the duration of the both-legs-grounded phase each can be given arbitrarily by the user.

The target relative ZMP trajectory of the above (4) is the sequential data of the relative position of a target ZMP to the reference point of the flat foot of the supporting leg. In regard to the one-leg-grounded phase, the target relative ZMP trajectory can be given arbitrarily by the user with a restriction that the ZMP lies inside the flat foot of the leg link being used as the supporting leg. If the ZMP lies inside the flat foot of the leg link being used as the supporting leg, the robot 2 is able to continue the walking movement without tumbling, even in a condition that the other leg link floats as the loose leg.

Here in the robot 2 of this embodiment, the relative trajectory of the center of gravity is generated without setting the target relative ZMP trajectory in regard to the both-legs-grounded phase. In the robot 2 of this embodiment, the relative trajectory of the center of gravity is generated in a manner that the center of gravity moves at an equal velocity in the both-legs-grounded phase, which will be detailed later. When the center of gravity moves at an equal velocity, the position of the ZMP that the robot 2 realizes is maintained vertically below the center of gravity. Therefore in the both-legs-grounded phase, as long as the center of gravity of the robot 2 moves from the position of the leg link grounded behind toward the position of the leg link grounded ahead, the robot 2 is able to continue the walking movement without tumbling.

In the robot 2 of this embodiment, the target relative ZMP trajectory is set in a manner that the ZMP is fixed to the center of the flat foot of the supporting leg in the one-leg-grounded phase. If such a relative ZMP trajectory is realized, the robot 2 will not tumble, and will realize a stable movement. Here in the one-leg-grounded phase, any trajectory may be given to the target relative ZMP trajectory, as long as it is maintained inside the flat foot of the supporting leg during the one-leg-grounded phase. For example, a trajectory may be used such that the ZMP moves from the rear part of the flat foot of the supporting leg to the front part thereof during the one-leg-grounded phase. If this type of relative ZMP trajectory is realized, the robot 2 will not tumble, and will realize a stable movement.

The target sequential data of angular momentum of the above (5) are sequential data of the angular momentum about the center of gravity of the robot 2. The target sequential data of angular momentum can be given arbitrarily by the user within a range that the performance of the actuator permits. The angular momentum about the roll axis (i.e. x' axis) and the pitch axis (i.e. y' axis) of the robot 2 can be set in a manner that the robot 2 realizes a desired posture. The angular momentum about the yaw axis (i.e. z' axis) can be set in a manner that the robot 2 realizes a desired turning movement.

In the robot 2 of this embodiment, the angular momentum about the roll axis, pitch axis, and yaw axis is set to be zero in every movement section.

The horizontal velocity of the center of gravity in switching the movement of the above (6) is a horizontal velocity of the center of gravity of the robot 2, when the movement of the robot 2 switches between the one-leg-grounded phase and the both-legs-grounded phase. The horizontal velocity of the center of gravity can be given arbitrarily by the user within a range that the performance of the actuator of the robot 2 permits.

Step S406 generates the trajectory of the center of gravity in the first movement section 1. The generation of the trajectory of the center of gravity in the movement section 1 at step is the same as the generation of the trajectory of the center of gravity in the general movement section k, which will be described later at step S410. The generation processing of the center-of-gravity trajectory will be detailed at S410. The vertical trajectory and horizontal trajectory of the center of gravity in the movement section 1 are generated by executing the processing at Step S406.

Step S408 adds 1 to the number k indicating the movement section where a movement is generated.

Step S410 generates the vertical trajectory and horizontal trajectory of the center of gravity in the movement section k.

The vertical trajectory of the center of gravity in the movement section k is determined based on the height of the center of gravity given in the form of a user command value. In the robot 2 of this embodiment, the vertical trajectory of the center of gravity is determined in a manner that the height of the center of gravity is always constant in the one-leg-grounded phase as well as the both-legs-grounded phase.

The method of generating the horizontal trajectory of the center of gravity in the movement section k differs in the one-leg-grounded phase and the both-legs-grounded phase. First, the generation of the horizontal trajectory of the center of gravity in the movement section k in the one-leg-grounded phase will be described. The horizontal trajectory of the center of gravity is determined based on the conditions of the vertical trajectory of the center of gravity in the one-leg-grounded phase, the target relative ZMP trajectory, the target sequential data of angular momentum, the horizontal velocity of the center of gravity at the start time and finish time of the one-leg-grounded phase. Step S410 calculates the horizontal trajectory of the center of gravity, in a manner that the relative ZMP trajectory when the vertical trajectory and horizontal trajectory of the center of gravity are realized becomes coincident with the target relative ZMP trajectory.

The vertical trajectory of the center of gravity has been determined based on the height of the center of gravity given in the form of the user command value. The target relative ZMP trajectory and the target sequential data of angular momentum are being given in the form of the user command value. The horizontal velocity of the center of gravity at the start time of the movement section is given based on the center-of-gravity trajectory in the section k−1 already generated, by specifying the horizontal velocity of the center of gravity at the finish time of the section k−1. The horizontal velocity of the center of gravity at the finish time of the one-leg-grounded phase is given in the form of the horizontal velocity of the center of gravity in switching the movement by the user command value. Step S410 calculates the horizontal trajectory of the center of gravity to meet these conditions.

The position ($p_{x'}$, $p_{y'}$) of the relative ZMP that the robot 2 realizes can be calculated based on the relative position (x', y', z') of the center of gravity of the robot 2, and the angular velocity ($\omega_{x'}$, $\omega_{y'}$), about the center of gravity of the robot 2 viewed from the coordinate system assuming the reference point of the flat foot of the supporting leg as the origin. The following formula is referred to as the ZMP equation, which calculates the relative ZMP realized by the robot 2 based on the relative position of the center of gravity of the robot 2 and the angular velocity about the center of gravity of the robot 2.

$$p_{x'} = \frac{m(z'^{(2)} + g)x' - mx'^{(2)}z' - I_{y'}\omega_{y'}^{(1)}}{m(z'^{(2)} + g)}$$

$$p_{y'} = \frac{m(z'^{(2)} + g)y' - my'^{(2)}z' + I_{x'}\omega_{x'}^{(1)}}{m(z'^{(2)} + g)}$$

[Formula 1]

Here, $^{(1)}$ represents the first order differential by the time t, and $^{(2)}$ represents the second order differential by the time t. And, m represents the mass of the robot 2.

In the above formula, z' is the vertical position of the center of gravity assuming the reference point of the flat foot of the supporting leg of the robot 2 as the origin, and $z'^{(2)}$ is the vertical acceleration thereof. Since the flat foot of the supporting leg of the robot 2 does not move to the floor, z' and $z'^{(2)}$ can be specified by the vertical trajectory of the center of gravity. Since the height of the center of gravity of the robot 2 in every movement section is constant, the vertical acceleration $z'^{(2)}$ is zero.

In the above formula, $I_{x'} \omega_{x'}^{(1)}$ and $I_{y'} \omega_{y'}^{(1)}$ represent the influence of rotational inertia of the robot 2. In this embodiment, the angular momentum about the roll axis (i.e. x' axis) and the pitch axis (i.e. y' axis) in every movement section is assumed to be zero, and $I_{x'} \omega_{x'}^{(1)}$ and $I_{y'} \omega_{y'}^{(1)}$ are zero.

Transforming the above ZMP equation into the discrete expression will derive the formula to calculate the sequential data of the horizontal position (x', y') of the center of gravity. The discrete expression here uses the unit time Δt in relation to the time t, as mentioned above. In regard to the trajectory of the center of gravity in x' direction, the following formula is acquired.

$$p_{x'i} = a_i x'_{i-1} + b_i x'_i + c_i x'_{i+1} + d_i \qquad \text{[Formula 2]}$$

Here, $x'_i$ and $p_{x'i}$ are the variables wherein the trajectory x'(t) in the x' direction of the center of gravity and the relative ZMP trajectory $p_{x'}(t)$ in the x' direction are discretely transformed, respectively. i signifies the order of time partitioned by the unit time. The formula 2 shows that the coordinate $p_{x'i}$ in the x' direction of the ZMP at time i can be calculated from the coordinate $x'_i$ in the x' direction at that time, the coordinate $x'_{i-1}$ in the x' direction directly before the time, and the coordinate $x'_{i+1}$ in the x' direction directly after the time. $a_i$, $b_i$, and $c_i$ are the coefficients calculated by the following formula.

$$a_i = c_i = -\frac{z'_i}{(z'^{(2)}_i + g)\Delta t^2}$$ [Formula 3]

$$b_i = 1 - 2a_i$$

In the above formula, $\Delta t$ represents the time breadth used in transforming the ZMP equation into the discrete expression, and $z'_i$ and $z'^{(2)}_i$ are the variables wherein the vertical position of the center of gravity and the acceleration are discretely transformed, respectively. In this embodiment, $\Delta t$ represents the time breadth to equally divide the duration of the one-leg-grounded phase into n.

Additionally, $d_i$ is the coefficient calculated by the following formula.

$$d_i = -\frac{I_{y'} \omega^{(1)}_{y'i}}{m(z'^{(2)}_i + g)}$$ [Formula 4]

Here, $I_{y'}\omega^{(1)}_{y'i}$ is the valuable wherein the target angular momentum about the pitch axis (i.e. y' axis) is transformed discretely. Here in the robot 2 of this embodiment, the target angular momentum is zero, and all $d_i$ are zero.

In this embodiment, the movement of the robot 2 is calculated in a manner that the trajectory of the center of gravity becomes smooth at the start time and finish time of the one-leg-grounded phase. By calculating the movement in this manner, the position of the center of gravity of the robot 2 smoothly moves till then the robot 2 grounds the loose leg (finish time of the one-leg-grounded phase), also at the time the robot 2 replaces the supporting leg and swings out the leg link having been the supporting leg till then newly as the loose leg (start time of the one-leg-grounded phase), and the robot 2 realizes a stabilized movement.

The velocity $v_{x'0}$ in the x' direction of the center of gravity at the start time of the one-leg-grounded phase in the movement section k is expressed by the following formula, using the partition time breadth $\Delta t$ and the position $x'_0$, $x'_1$ of the center of gravity.

$$v_{x'0}\Delta t = x'_1 - x'_0$$ [Formula 5]

The above velocity $v_{x'0}$ in the x' direction of the center of gravity at the start time of the one-leg-grounded phase in the movement section k is set from the trajectory of the center of gravity in the movement section k−1 already calculated. If k is 2, for example, the horizontal velocity $v_{x'0}$ of the center of gravity at the start time of the section 2 is assumed to be the horizontal velocity of the center of gravity at the finish time of the section 1, which is specified by the horizontal trajectory in the section 1.

In the same manner, the velocity $v_{x'n-1}$ in the x' direction of the center of gravity at the finish time of the one-leg-grounded phase in the movement section k has the following relation with the partition time breadth $\Delta t$ and the position $x'_{n-2}$, $x'_{n-1}$ of the center of gravity.

$$v_{x'n-1}\Delta t = x'_{n-1} - x'_{n-2}$$ [Formula 6]

The above velocity $v_{x'n-1}$ in the x' direction of the center of gravity at the finish time of the one-leg-grounded phase in the movement section k is assumed to be the horizontal velocity of the center of gravity in switching the movement, which is given in the form of user command value.

To organize the above relations, the trajectory $(x'_0, x'_1, \ldots, x'_{n-1})$ in the x' direction of the center of gravity in the one-leg-grounded phase in the movement section k, which realizes the relative ZMP trajectory that is equal to the target relative ZMP trajectory, can be calculated by solving the following equations given in the form of a tridiagonal matrix (i.e. tridiagonal equations).

$$\begin{bmatrix} -1 & 1 & 0 & 0 & & & & & \\ a_1 & b_1 & c_1 & 0 & & & & & \\ 0 & a_2 & b_2 & c_2 & & & 0 & & \\ & & & \ddots & & & & & \\ & & & & \ddots & & & & \\ & & 0 & & & a_{n-3} & b_{n-3} & c_{n-3} & 0 \\ & & & & & 0 & a_{n-2} & b_{n-2} & c_{n-2} \\ & & & & & 0 & 0 & -1 & 1 \end{bmatrix} \begin{bmatrix} x'_0 \\ x'_1 \\ x'_2 \\ \vdots \\ \vdots \\ x'_{n-3} \\ x'_{n-2} \\ x'_{n-1} \end{bmatrix} = \begin{bmatrix} v_{x'0}\Delta t \\ p_{x'1} - d_1 \\ p_{x'2} - d_2 \\ \vdots \\ \vdots \\ p_{x'n-3} - d_{n-3} \\ p_{x'n-2} - d_{n-2} \\ v_{x'n-1}\Delta t \end{bmatrix}$$ [Formula 7]

The left-hand side in the above formula is expressed in the form of the product of a matrix and a column vector, and the matrix is a tridiagonal matrix having coefficients calculated by a vertical trajectory. The tridiagonal matrix refers to a matrix such that the diagonal components and the sub-diagonal components adjoining thereto have significant values and the other components are zero. The column vector on the left-hand side is a column vector representing the trajectory $(x'_0, x'_1, \ldots, x'_{n-1})$ in the x' direction of the center of gravity. The column vector on the right-hand side is a column vector having: a target relative ZMP trajectory to which a correction is applied on the basis of a target angular momentum, a distance $v_{x'0}\Delta t$ acquired by multiplying the velocity $v_{x'0}$ in the x' direction of the center of gravity at the start time of the one-leg-grounded phase and the unit time $\Delta t$, and a distance $v_{x'n-1}\Delta t$ acquired by multiplying the velocity $v_{x'n-1}$ in the x' direction of the center of gravity at the finish time of the one-leg-grounded phase and the unit time $\Delta t$.

Calculating an inverse matrix of the tridiagonal matrix on the left-hand side of the formula 7, and calculating the product of the inverse matrix and the right-hand side will calculate an unknown $(x'_0, x'_1, \ldots, x'_{n-1})$. Thereby, the trajectory in the x' direction of the center of gravity can be calculated.

The center-of-gravity trajectory $(y'_1, \ldots, y'_{n-1})$ in the y' direction in the one-leg-grounded phase in the movement section k can also be calculated from a relative ZMP position $(p_{y'1}, \ldots, p_{y'n-2})$ in the y' direction, a target angular momentum about the roll axis (i.e. x' axis), and a center-of-gravity velocity $v_{y'0}$ at the start time of the one-leg-grounded phase in the movement section k and a center-of-gravity velocity $v_{y'n-1}$ at the finish time, in the same manner as the center-of-gravity trajectory $(x'_0, x'_1, \ldots, x'_{n-1})$ in the x' direction.

The above method can directly calculate the horizontal trajectory of the center of gravity that meets the target relative ZMP trajectory, without calculating the horizontal trajectory of the center of gravity in a try-and-error manner. The above method involves a comparably small quantity of calculations, and a high-speed calculation becomes possible.

Instead of the above horizontal velocity $v_{x'0}$, $v_{y'0}$, the user may give a horizontal unit vector $n_{x'}$, $n_{y'}$ indicating the direction to which the center of gravity moves, and an absolute value $|v|$ of the velocity, as the horizontal velocity of the center of gravity in switching the movement. In this case, the horizontal velocity $v_{x'0}$, $v_{y'0}$, can be calculated by the following formula.

$$v_{x'0} = |v| \cdot n_{x'}$$
$$v_{y'0} = |v| \cdot n_{y'}$$
[Formula 8]

In the center-of-gravity trajectory generated by the above method, the ZMP calculated by the ZMP equation is not always guaranteed to coincide with the target ZMP at both the start time and the finish time of the one-leg-grounded phase. However, the center-of-gravity velocity is connected smoothly at the start time and the finish time of the one-leg-grounded phase, and the duration that does not meet the ZMP equation is extremely short (about double the time breadth $\Delta t$ used for transforming the ZMP equation discretely); thereby, the robot 2 that realizes the movement generated as the above is able to perform a stabilized movement without tumbling.

Next, the calculation of the horizontal trajectory of the center of gravity in the movement section k in the both-legs-grounded phase will be described. In the both-legs-grounded phase, the robot 2 of this embodiment moves the center of gravity at an equal velocity. Therefore, the horizontal trajectory of the center of gravity in the both-legs-grounded phase can be generated from a position of the center of gravity at the start time of the both-legs-grounded phase, a center-of-gravity velocity in the both-legs-grounded phase, and the duration of the both-legs-grounded phase. The position of the center of gravity at the start time of the both-legs-grounded phase is given by specifying a position of the center of gravity at the finish time of the one-leg-grounded phase directly before. The center-of-gravity velocity in the both-legs-grounded phase is given by the above horizontal velocity $v_{x'0}$, $v_{y'0}$. The duration of the both-legs-grounded phase is already given in the form of the user command value. Thereby, the horizontal trajectory of the center of gravity in the both-legs-grounded phase can be generated.

When the center of gravity of the robot 2 is moved at an equal velocity, the sum of the horizontal components of external forces acting on the robot 2 is zero; therefore, the ZMP that the robot 2 realizes lies vertically below the center of gravity. Therefore, in the both-legs-grounded phase, the robot 2 is able to perform a stabilized movement without tumbling, as long as the horizontal position of the center of gravity moves from the position of the leg link grounded behind toward the position of the leg link grounded ahead.

Step S412 calculates a ground position of a loose leg in transferring from the one-leg-grounded phase to the both-legs-grounded phase. The ground position of the loose leg is calculated as a relative position of the reference point of the flat foot of the loose leg to the reference point of the flat foot of the supporting leg at the finish time of the one-leg-grounded phase in the section k-1. The leg link being the loose leg in the one-leg-grounded phase of the section k-1 becomes the supporting leg in the one-leg-grounded phase of the section k. Therefore, the position on the floor where the flat foot of the supporting leg is to be grounded in the one-leg-grounded phase of the section k varies corresponding to the position where the loose leg is grounded in the section k-1. In the robot 2 of this embodiment, the ground position of the loose leg in the section k-1 is determined in a manner that the movement of the one-leg-grounded phase in the section k becomes stable.

First, the relative position ($\Delta x_f'$, $\Delta y_f'$) of the center of gravity from the reference point of the flat foot of the supporting leg at the start time of the section k is specified from the relative trajectory of the center of gravity in the one-leg-grounded phase of the section k generated at Step S410. The specified relative position ($\Delta x_f'$, $\Delta y_f'$) of the center of gravity corresponds to the relative position of the center of gravity from the reference point of the flat foot of the leg link grounded ahead at the finish time of the both-legs-grounded phase of the section k-1.

Next, the relative position ($\Delta x_b'$, $\Delta y_b'$) of the center of gravity from the reference point of the flat foot of the leg link grounded behind at the finish time of the both-legs-grounded phase of the section k-1 is specified from the relative trajectory of the center of gravity in the both-legs-grounded phase of the section k-1 already generated.

And, by calculating the difference between the relative position ($\Delta x_f'$, $\Delta y_f'$) of the center of gravity from the reference point of the flat foot of the leg link grounded ahead and the relative position ($\Delta x_b'$, $\Delta y_b'$) of the center of gravity from the reference point of the flat foot of the leg link grounded behind, at the finish time of the both-legs-grounded phase of the section k-1, the relative position ($s_x$, $s_y$) between the reference point of the flat foot of the leg link grounded ahead and the reference point of the flat foot of the leg link grounded behind is specified. Since the flat feet of both the leg links do not move to the floor in the both-legs-grounded phase, the relative position ($s_x$, $s_y$) thus specified corresponds to the relative position between the reference point of the flat foot of the supporting leg and the reference point of the flat foot of the loose leg at the finish time of the one-leg-grounded phase of the section k-1, that is, the ground position of the loose leg.

Figure 5:
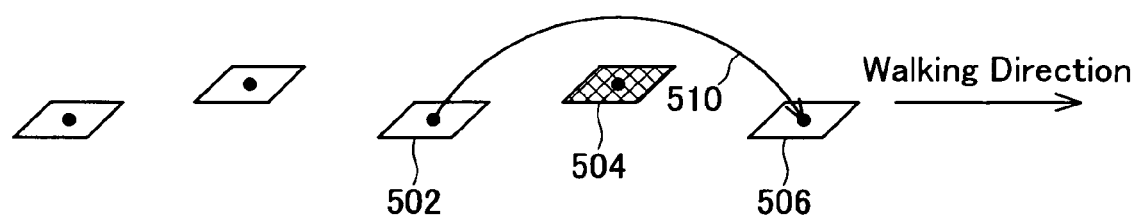
FIG. 5 is a chart illustrating a relative trajectory of the toe of a loose leg of the robot 2 relating to the present invention.

Step S414 generates a relative trajectory of the toe of the loose leg in the section k-1. The relative trajectory of the toe of the loose leg is generated from a relative position of the loose leg at the start time of the one-leg-grounded phase of the section k-1 (i.e., ground position directly before lifting up the leg link becoming the loose leg), a relative position of the loose leg at the finish time of the one-leg-grounded phase of the section k-1 (i.e., ground position of the loose leg determined at step S412), and a duration of the one-leg-grounded phase given in the form of the user command value. FIG. 5 typically illustrates the state wherein a relative trajectory 510 of the toe of the loose leg is generated. As illustrated in FIG. 5, in the one-leg-grounded phase of the section k-1, in the state that the flat foot of the supporting leg is grounded at a ground position 504, the relative trajectory 510 of the toe of the loose leg is generated so as to lift up the flat foot of the loose leg from a ground position 502 and then move the flat foot of the loose leg to a ground position 506 at the time the duration of the one-leg-grounded phase finishes. The relative trajectory 510 of the toe of the loose leg can be generated by using the polynomial interpolation, for example.

Step S416 judges whether the generation of the relative trajectory of the center of gravity finishes in all of the movement sections. This judgment is made by comparing the number k of the movement section subjected to the processing with the number $k_{max}$ of the last movement section. If k is equal to or larger than $k_{max}$ (i.e. Yes at step S416), the step judges that the generation of the relative trajectory of the center of gravity finishes in all of the movement sections, and moves the processing to step S418. If k is smaller than $k_{max}$ (i.e. No at step S416), the step moves the processing to step S408 to generate the trajectory of the center of gravity in the movement sections, the trajectory of which is not yet generated, and the processing from step S408 through step S414 are repeatedly executed.

Step S418 determines the ground position of the loose leg in the last movement section $k_{max}$. The ground position of the loose leg can be determined arbitrarily as to the last movement section $k_{max}$. In the robot 2 of this embodiment, the ground position of the loose leg is set to the side of the ground position of the supporting leg, so that the robot 2 can take an upright posture after the last movement section $k_{max}$ finishes.

Step S420 generates the relative trajectory of the toe of the loose leg, as to the last movement section $k=k_{max}$. The processing at step S420 is the same as that of step S414, and the description will be omitted.

Figure 4:
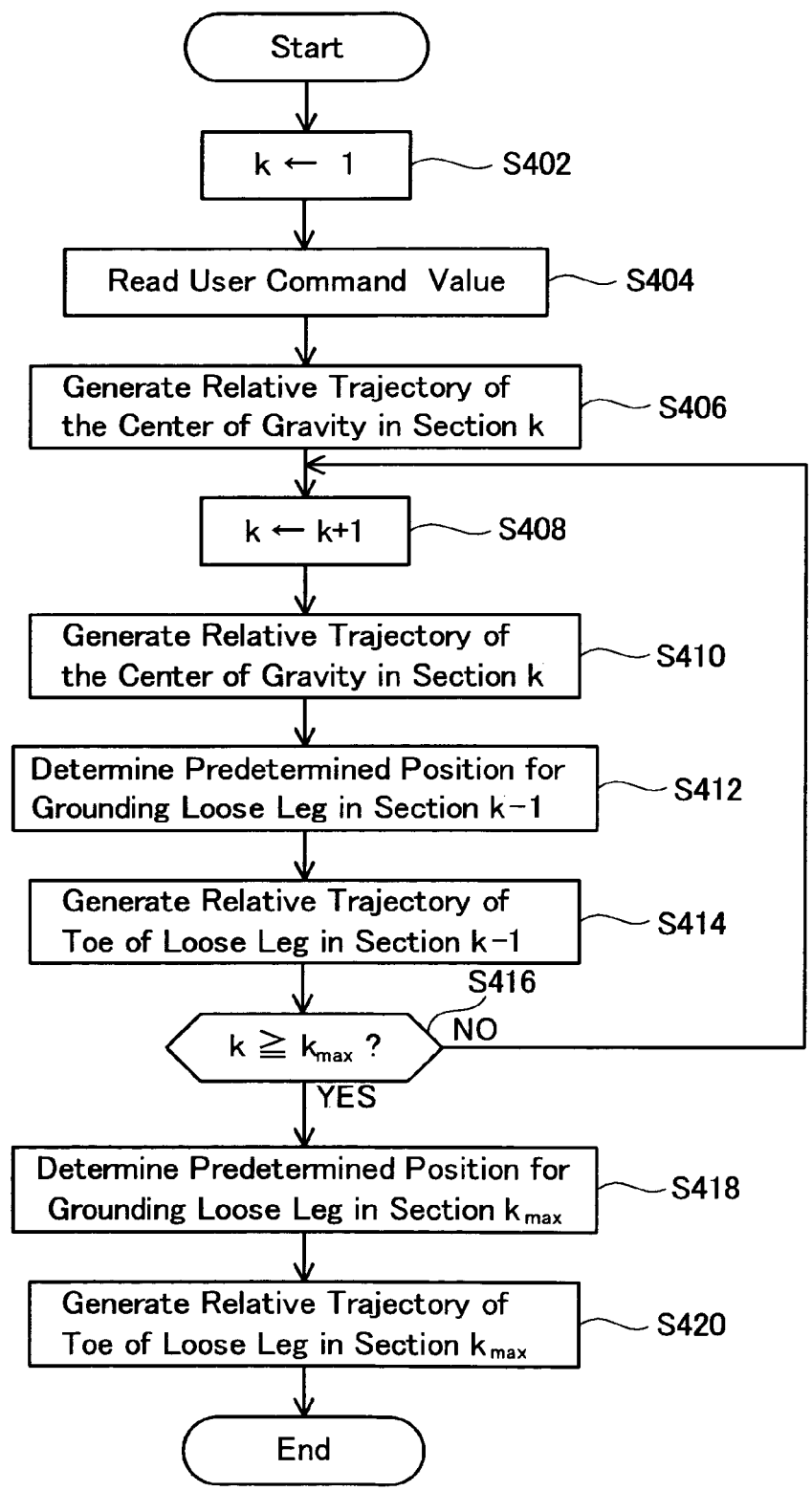
FIG. 4 is a flow chart illustrating a generation processing of gait data of the robot 2 relating to the present invention.

By the processing shown in FIG. 4, the relative trajectory of the center of gravity and the relative trajectory of the toe of the loose leg are generated to realize the walking movement of the robot 2. The relative trajectory of the center of gravity and the relative trajectory of the toe of the loose leg thus generated are stored in the gait data storage device 308.

As the walking movement of the robot 2 starts, the target joint angle generation device 312, reading the relative trajectory of the center of gravity and the relative trajectory of the toe of the loose leg from the gait data storage device 308, generates the sequential data of the target joint angles of each joint by the inverse kinematics calculation. The actuator control device 314 drives the actuator group 318 based on the generated sequential data of the target joint angles, and the robot 2 realizes the walking movement based on the user command value.

While the robot 2 realizes the walking movement, the control unit 10 watches the switching from the one-leg-grounded phase to the both-legs-grounded phase. The switching from the one-leg-grounded phase to the both-legs-grounded phase can be judged from the relative trajectory of the toe of the loose leg that the target joint angle generation device 312 has read from the gait data storage device 308. At a moment that the movement of the robot 2 switches from the one-leg-grounded phase to the both-legs-grounded phase, the control unit 10 updates the gait data in the movement sections after the moment.

Figure 6:
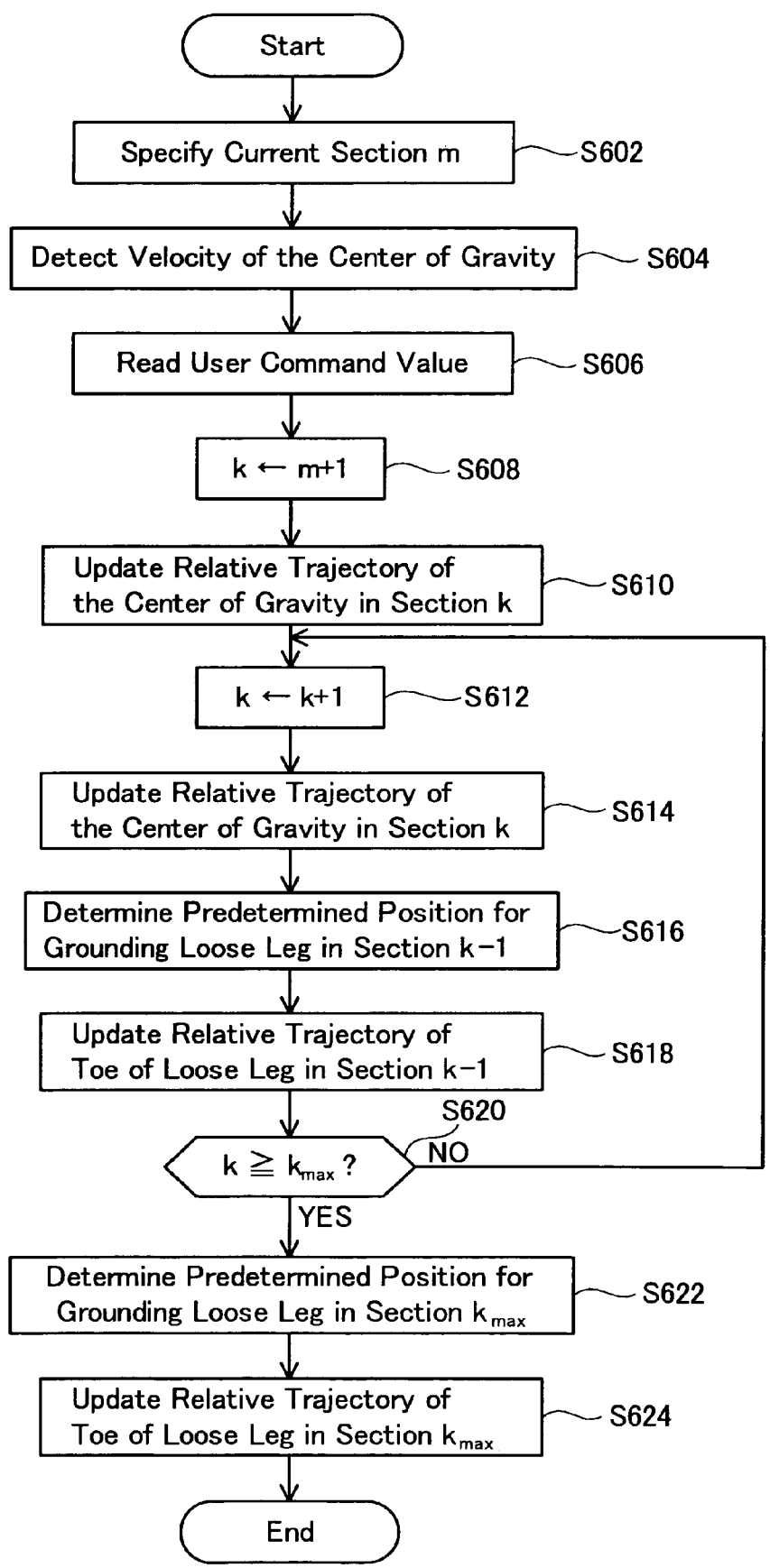
FIG. 6 is a flow chart illustrating an update processing of the gait data of the robot 2 relating to the present invention.

FIG. 6 is a flow chart explaining the processing whereby the gait data update device 310 of the control unit 10 updates the gait data of the robot 2.

Step S602 specifies a current movement section m, in which the robot 2 is performing the movement at that moment.

Step S604 detects an actual velocity of the center of gravity by using the center-of-gravity velocity calculation device 316.

Step S606 reads the user command value stored in the user command value storage device 304.

Step S608 sets the movement section k of which gait data are to be updated. In the robot 2 of this embodiment, the movement section next to the current movement section m specified at step S602 is set as the movement section k of which gait data are to be updated.

Step S610 generates the relative trajectory of the center of gravity in the movement section k. The processing of generating the relative trajectory of the center of gravity executed at Step S610 is substantially the same as the processing at step S410 in FIG. 4, except the method of giving the horizontal velocity of the center of gravity at the start time of the one-leg-grounded phase. Step S610 uses the actual velocity of the center of gravity detected at step S604, as the horizontal velocity of the center of gravity at the start time of the one-leg-grounded phase in the movement section k.

The processing from step S612 through step S624 is the same as the processing from step S408 through step 420 in FIG. 4, and the detailed description thereof will be omitted here. Thereby, the relative trajectory of the center of gravity on and after the movement section k+1, the predetermined position for grounding the loose leg on and after the movement section k, and the relative trajectory of the toe of the loose leg on and after the movement section k are updated.

As mentioned above, the robot 2 of this embodiment executes the update processing of the gait data, at each time of switching the movement from the one-leg-grounded phase into the both-legs-grounded phase. Therefore, if a new user command value is inputted from the user during the movement of the robot 2, the movement can be modified to conform to the new user command value.

The robot 2 of this embodiment measures the actual velocity of the center of gravity by using the sensor group 14 and the encoder group 320 when updating the above gait data, and updates the trajectory of the center of gravity thereafter so as to smoothly connect to the measured velocity of the center of gravity. If unexpected disturbances act on the robot 2, the trajectory of the center of gravity thereafter is updated in response to the disturbances, and the robot 2 is able to continue a stabilized walk.

The robot 2 of this embodiment sets the ground position of the loose leg when the movement is switched from the one-leg-grounded phase into the both-legs-grounded phase, on the basis of the relative trajectory of the center of gravity in the both-legs-grounded phase and the following relative trajectory of the center of gravity in the one-leg-grounded phase, so that the movement thereafter becomes stable. By setting the ground position of the loose leg in this manner, the robot 2 is able to realize a stabilized walking movement to a large extent.

The above embodiment described an example that calculates an acceleration of the center of gravity from the measurement of the acceleration sensor 322 installed in the trunk 4 and the measurement of the encoder group 320 installed in each of the joints, and detects the velocity of the center of gravity by integrating the acceleration of the center of gravity by the time. However, the detection of the acceleration of the center of gravity is not limited to this; it is conceivable, for example, to install plural acceleration sensors in the robot 2 and calculate the acceleration of the center of gravity from the positions of measuring points of these acceleration sensors and the measurements thereof. Or, the acceleration of the center of gravity may be calculated from the measurements of the acceleration sensor and the measurements of the gyro sensor.

The above embodiment describes an example that measures the velocity of the center of gravity based on the acceleration measured by the sensor group 14; however the measurement of the velocity of the center of gravity is not limited to this.

It is possible to find the velocity of the center of gravity, for example, by measuring the position of a representative point of the robot 2 by using a distance-measuring sensor fixed to the floor outside the robot 2, calculating a relative positional relation between the representative point and the center of gravity from the joint angle of each joint, calculating a position of the center of gravity from the relative position between the center of gravity and the representative point, and a measured position of the representative point, and calculating a variation rate with time of the position of the center of gravity.

Or, it is conceivable to mount a GPS receiver on the trunk 4, calculate a position of the center of gravity from a position acquired by the GPS receiver and a joint angle of each joint, and calculate the velocity of the center of gravity from the variation with time of the position of the center of gravity.

Or, the velocity of the center of gravity may be calculated directly by using only the variation with time of the joint angle of each joint.

The above embodiment describes an example that, while the robot 2 is actually walking, updates the predetermined position for grounding the loose leg on and after the movement section m+1, at the timing the robot 2 grounds the loose leg in the movement section m. Thus, updating the predetermined position for grounding the loose leg in the movement section m+1, before the robot 2 starts the movement in the movement section m+1, will prevent a sudden change of the movement in the one-leg-grounded phase, and the robot 2 is able to perform a stabilized movement.

Different from the above, the construction may be adopted that, while the robot 2 performs the movement in a movement section m of the one-leg-grounded phase, updates the predetermined position for grounding the loose leg in the movement section m. In such a case, even if there are unexpected disturbances acting on the robot in the movement section m of the one-leg-grounded phase, it is possible to update the relative trajectory of the center of gravity on and after the movement section m+1 in response to the disturbances, and to update, in response to the updated relative trajectory of the center of gravity, the predetermined position for grounding the loose leg in the movement section m and the relative trajectory of the toe of the loose leg. The robot 2 is able to quickly recover a stable walking movement, in swift response to the disturbances acting on the robot 2.

The above embodiment describes an example that the height of the center of gravity of the robot 2 given in the form of the user command value as constant in all the movement sections; however, the height of the center of gravity of the robot 2 may be made to vary with time. Provided that the vertical trajectory of the robot 2 is acquired before generating the horizontal trajectory of the center of gravity of the robot 2, solving the above tridiagonal matrix will generate the horizontal trajectory corresponding to that vertical trajectory.

The present invention has been described in detail with concrete examples; however these are only illustrations, which will not confine the scope of the claims. The technique described in the claims includes the concrete examples illustrated above, various changes and modifications of these examples.

Further, the technical elements described in this specification or the drawings will exhibit technical usefulness alone or by various combinations, which will not be limited to the combinations of the claims on the occasion of application. And the technique illustrated in this specification or the drawings will accomplish plural objectives at the same time, and to accomplish one objective of those in itself will show technical usefulness.

The invention claimed is:

1. A robot comprising a trunk, a pair of leg links coupled with the trunk in a swingable manner, an actuator group that swings each of the leg links independently with respect to the trunk, and a controller that controls the actuator group, which walks by repeating a sequence of actions of swinging out one leg link with respect to the trunk and grounding it while keeping another leg link touching the ground as a support leg mutually between a pair of the leg links by alternatively changing the support leg, wherein:

the controller is programmed to control the actuator group, when a relative trajectory of the center of gravity of the robot with respect to a toe of one leg link that is grounding as the support leg and a relative trajectory of a toe of another leg link with respect to the toe of the one leg link are given, to realize the given relative trajectory of the center of gravity and the relative trajectory of the toe of the leg link; and the controller performs, in a period from grounding the one leg link to grounding the other leg link swung out thereafter, (1) updating the relative trajectory of the center of gravity of the robot with respect to the toe of the one leg link after having swung out the one leg link by calculating a tridiagonal equation in which a zero movement position (ZMP) equation is discrete, such that a relative ZMP trajectory with respect to the toe of the other leg link, which the robot plans to realize after the other leg link grounds and the one leg link is swung out, matches with a target relative ZMP trajectory, (2) determining by a processor a predetermined position for grounding the other leg link, such that a position of the center of gravity at a beginning of the updated relative trajectory of the center of gravity with respect to the toe of the other leg link after having the one leg link swung out matches a position of the center of gravity at an end of the relative trajectory of the center of gravity with respect to the toe of the one leg link till the one leg has been swung out, and (3) updating the relative trajectory of the toe of the other leg link with respect to the toe of the one leg link till grounding the other leg link, on the basis of the determined predetermined position for grounding.

2. A robot according to claim 1, wherein a horizontal component of the trajectory of the center of gravity in a period of grounding both the leg links is given in a form of a constant velocity trajectory.

3. A method of controlling a robot comprising a trunk, a pair of leg links coupled with the trunk in a swingable manner, an actuator group that swings each of the leg links independently with respect to the trunk, and a controller that, when a relative trajectory of the center of gravity of the robot with respect to a toe of one leg link that is grounding as the support leg and a relative trajectory of a toe of another leg link with respect to the toe of the one leg link are given, controls the actuator group so as to realize the given trajectory of the center of gravity and the trajectory of the toe, which walks by repeating a sequence of actions of swinging out one leg link with respect to the trunk and grounding it while keeping another leg link touching the ground as a support leg mutually between a pair of the leg links by alternatively changing the support leg, the method comprising the steps of, in a period from grounding the one leg link to grounding the other leg link swung out thereafter:

(1) updating the relative trajectory of the center of gravity of the robot with respect to the toe of the one leg link after having swung out the one leg link by calculating a tridiagonal equation in which a zero movement position (ZMP) equation is discrete, such that a relative ZMP trajectory with respect to the toe of the other leg link, which the robot plans to realize after the other leg link grounds and the one leg link is swung out, matches with a target relative ZMP trajectory, (2) determining by a processor a predetermined position for grounding the other leg link, such that a position of the center of gravity at a beginning of the updated relative trajectory of the center of gravity with respect to the toe of the other leg link after having the one leg link swung out matches a position of the center of gravity at an end of the relative trajectory of the center of gravity with respect to the toe of the one leg link till the one leg has been swung out, and (3) updating the relative trajectory of the toe of the other leg link with respect to the toe of the one leg link till grounding the other leg link, on the basis of the determined predetermined position for grounding.

* * * * *